United States Patent [19]

Willard

[11] Patent Number: 5,352,499
[45] Date of Patent: Oct. 4, 1994

[54] MULTILAYERED STRUCTURES COMPRISING POLYCARBONATE LAYERS AND FUNCTIONALIZED POLYAMIDE LAYER

[75] Inventor: G. Fred Willard, Dalton, Mass.

[73] Assignee: General Electric Company, Pittsfield, Mass.

[21] Appl. No.: 827,855

[22] Filed: Jan. 30, 1992

Related U.S. Application Data

[63] Continuation of Ser. No. 423,309, Oct. 18, 1989, abandoned.

[51] Int. Cl.$^5$ .................. B32B 1/08; B32B 27/36; B65D 1/00
[52] U.S. Cl. .................. 428/357; 428/36.91; 428/412; 428/36.6; 428/36.7; 428/475.2; 428/475.5; 428/480; 428/474.4
[58] Field of Search .................. 428/35.7, 36.91, 412, 428/36.6, 36.7, 475.2, 475.5, 480, 474.4; 528/337

[56] References Cited

U.S. PATENT DOCUMENTS

| 3,379,693 | 4/1968 | Hostettler et al. | 260/77.5 |
| 3,549,601 | 12/1970 | Fowell | 270/78 |
| 4,185,150 | 1/1980 | Kuceski | 528/336 |
| 4,443,593 | 4/1984 | Collins | 528/210 |
| 4,513,037 | 4/1985 | Collins | 428/35 |
| 4,717,764 | 1/1988 | Ward | 528/337 |
| 4,728,697 | 3/1988 | Bolon et al. | 525/424 |
| 4,732,934 | 3/1988 | Hathaway et al. | 525/66 |
| 4,732,937 | 3/1988 | Sybert | 525/92 |
| 4,734,331 | 3/1988 | Giles, Jr. et al. | 428/412 |

OTHER PUBLICATIONS

Japanese Abstract 63120645—World Patents Index Latest Accession No. 88-185220, Week 27, Derwent Publications Ltd.

*Primary Examiner*—Ellis P. Robinson
*Assistant Examiner*—Charles R. Nold

[57] ABSTRACT

Multilayered structures comprising polycarbonate layers and functionalized polyamide layers exhibit adhesion to each other without the use of a tie layer. The multilayered structures are useful in containers requiring the combined properties of high impact strength and chemical resistance and/or oxygen barrier resistance.

7 Claims, No Drawings

MULTILAYERED STRUCTURES COMPRISING POLYCARBONATE LAYERS AND FUNCTIONALIZED POLYAMIDE LAYER

This is a continuation of application Ser. No. 07/423,309 filed Oct. 18, 1989, now abandoned.

BACKGROUND OF THE INVENTION

1. Field of the Invention

The present invention relates to multilayered structures having polycarbonate and polyamide layers; and, more particularly, relates to multilayered structures having a functionalized polyamide layer and a polycarbonate resin layer.

2. Description of Related Art

Multilayered structures having a polycarbonate layer and a polyamide layer have been employed in the past (see for example Collins, U.S. Pat. No. 4,513,037) wherein is disclosed a multilayered structure having a polycarbonate outer layer, a polycarbonate inner layer, and a polyamide intermediate layer between the two polycarbonate layers. The polycarbonate layers provide the structure with good impact strength, but typically lack desired levels of oxygen barrier properties. The polyamide layer, in particular amorphous polyamides, provides the structure with the desired levels of oxygen barrier properties, but typically lacks adequate impact strength. The multiple layer structure of Collins combines the desired properties of the polycarbonate layer and the polyamide layer to obtain a structure having both adequate impact strength and adequate oxygen barrier properties.

Multiple layered structures of a polycarbonate layer and a polyamide layer generally lack desired levels of adhesion and require the use of tie layers if adhesion is to be obtained between the layers. Tie layers however can add additional processing requirements in the creation of the structure. Multiple layered structures consisting of polycarbonate layers and polyamide layers in direct contact with each other which do not employ a tie layer have generally resulted in laminates which delaminate under stress. Thus, it is an object of the present invention to provide a multilayered structure having good direct adhesion between the polyamide layer and the polycarbonate layer comprising layers of a polycarbonate resin layer and an amine functionalized polyamide resin in direct adhering contact with each other.

SUMMARY OF THE INVENTION

The present invention relates to multilayered structures comprising a polycarbonate layer and an amine functionalized polyamide layer. The multilayered structures exhibit good direct contact adhesion between the layers of a polycarbonate resin and a polyamide resin in direct contact with each other and bonded to each other without the use of a tie layer between the polycarbonate layer and the polyamide layer. Exemplary multilayered structures include laminates and shaped articles, such as bottles.

DETAILED DESCRIPTION OF THE INVENTION

The present invention relates to multilayered structures comprising a polycarbonate layer in direct contact with a polyamide layer and bonded thereto without the use of a tie layer therebetween. The multilayered structures of the present invention comprise a layer of a functionalized polyamide which is derived from a dicarboxylic acid, a diamine and a polyamine.

Polycarbonates for use in the structures of the present invention are high molecular weight, thermoplastic, aromatic polymers and include homopolycarbonates, copolycarbonates and copolyestercarbonates and mixtures thereof which have average molecular weights of about 8,000 to more than 200,000, preferably of about 20,000 to 80,000 and an I.V. of 0.40 to 1.0 dl/g as measured in methylene chloride at 25° C. In one embodiment, the polycarbonates are derived from dihydric phenols and carbonate precursors and generally contain recurring structural units of the formula:

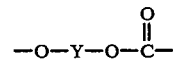

where Y is a divalent aromatic radical of the dihydric phenol employed in the polycarbonate producing reaction.

Suitable dihydric phenols for producing polycarbonates include the dihydric phenols such as, for example, 2,2-bis(4-hydroxyphenyl)propane, bis(4-hydroxyphenyl)methane, 2,2-bis(4-hydroxy-3-methylphenyl)propane, 4,4-bis(4-hydroxyphenyl)heptane, 2,2-(3,5,3',5'-tetrachloro-4,4'-dihydroxyphenyl)propane, 2,2-(3,5,3',5'-tetrabromo-4,4'-)propane, and 3,3'-di-chloro-4,4-dihydroxydiphenyl)methane. Other dihydric phenols which are also suitable for use in the preparation of the above polycarbonates are disclosed in U.S. Pat. Nos. 2,999,835, 3,038,365, 3,334,154, and 4,131,575, incorporated herein by reference.

It is of course possible to employ two or more different dihydric phenols or a copolymer of a dihydric phenol with a glycol or with a hydroxy- or acid- terminated polyester, or with a dibasic acid in the event a carbonate copolymer or interpolymer rather than a homopolymer is desired for use in the preparation of the articles of the invention. Blends of any of the above materials can also be employed to provide the aromatic polycarbonate. In addition, branched polycarbonates such as are described in U.S. Pat. No. 4,001,184, can also be utilized in the practice of this invention, as can blends of a linear polycarbonate and a branched polycarbonate.

The carbonate precursor employed can be either a carbonyl halide, a carbonate ester or a haloformate. The carbonyl halides which can be employed are carbonyl bromide, carbonyl chloride and mixtures thereof. Typical of the carbonate esters which can be employed are diphenyl carbonate, a di(halophenyl)carbonate such as di(chlorophenyl)carbonate, di(bromophenyl)carbonate, di(trichlorophenyl)carbonate, di(tribromophenyl)carbonate, etc., di(alkylphenyl)carbonate such as di(tolyl)carbonate, etc., di(naphthyl)carbonate, di(chloronaphthyl)carbonate, etc., or mixtures thereof. The suitable haloformates include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

The polycarbonate may also be a copolyestercarbonate as described in Clayton B. Quinn in U.S. Pat. No. 4,430,484 and the references cited therein, incorporated herein by reference. Preferred polyestercarbonates are those derived from the dihydric phenols and carbonate precursors described above and aromatic dicarboxylic acids or their relative derivatives, such as the acid dihalides, e.g., dichlorides. A quite useful class of aromatic polyestercarbonates are those derived from bisphenol A; terephthalic acid, isophthalic acid or a mixture thereof or their respective acid chlorides; and phosgene. If a mixture of terephthalic acid and isophthalic acid is employed, the weight ratio of terephthalic acid to isophthalic acid may be from about 5:95 to about 95:5. Another polycarbonate which may be used has from about 70 to about 95 weight percent ester content and a range of terephthalate groups of from 2 to about 15 weight percent of the total ester content. The remaining ester units are isophthalate units. These polycarbonates are more commonly known as polyphthalate carbonates and are described, for example, by Miller, et. al., U.S. Pat. No. 4,465,820, herein incorporated by reference in its entirety.

The polycarbonates used to form the present invention can be manufactured by known processes, such as, for example, by reacting a dihydric phenol with a carbonate precursor such as diphenyl carbonate or phosgene in accordance with the methods set forth in the above-cited literature and U.S. Pat. Nos. 4,018,750 and 4,123,436, or by transesterification processes such as are disclosed in U.S. Pat. No. 3,153,008 as well as other processes known to those skilled in the art.

The aromatic polycarbonates are typically prepared by employing a molecular weight regulator, an acid acceptor and a catalyst. The molecular weight regulators which can be employed include phenol, cyclohexanol, methanol, alkylated phenols, such as octrylphenol, paratertiary-butyl-phenol, etc. Preferably, phenol or an alkylated phenol is employed as the molecular weight regulator.

The acid acceptor can be either an organic or an inorganic acid acceptor. A suitable organic acid acceptor is a tertiary amine and includes such materials as pyridine, triethyl amine, dimethylaniline, tributylamine, etc. The inorganic acid acceptor can be one which can be either a hydroxide, a carbonate, a bicarbonate, or a phosphate or an alkali or alkaline earth metal.

The catalyst which can be employed are those that typically aid the polymerization of the monomer with phosgene. Suitable catalysts include tertiary amines such as tri ethyl amine, tripropyl amine, N,N-dimethylaniline, quaternary ammonium bromide, cetyl triethyl ammonium bromide, tetra-n-heptyl ammonium iodide, tetra-n-propyl ammonium bromide, tetramethyl ammonium chloride, tetra-methyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also included are branched polycarbonates wherein a polyfunctional aromatic compound is reacted with the monomer and carbonate precursor to provide a thermoplastic randomly branched polycarbonate. The polyfunctional aromatic compounds contain at least three functional groups which are carboxyl, carboxylic anhydride, haloformyl, or mixtures thereof. Illustrative polyfunctional aromatic compounds which can be employed include trimellitic anhydride, trimellitic acid, trimellityl trichloride, 4-chloroformyl phthalic anhydride, pyromellitic acid, pyromellitic dianhydride, mellitic acid, mellitic anhydride, benzophenone-tetracarboxylic anhydride, and the like. The preferred polyfunctional aromatic compounds are trimellitic anhydride and trimellitic acid or their acid halide derivatives.

Polyamides for use in the production of the multilayered structures of the present invention are produced from the reaction products of a diamine and a carboxylic acid or a reactive diester thereof wherein the polyamide is chemically modified by substituting a polyfunctional monomer for a portion of the diamine in the synthesis step. Preferably, the polyamides have an amine number of at least 105 meq/kg to facilitate adhesion between the layers.

Suitable diamines for use in the production of the polyamides are of the general formula:

$$H_2N - R_1 - NH_2$$

wherein $R_1$ is an aliphatic, aromatic, unsaturated, or branched hydrocarbon having from 1 to 20 carbon atoms, and mixtures thereof. Examples of suitable diamines include ethylene diamine, decamethylene diamine, dodecamethylene diamine, 2,2,4- or 2,4,4-trimethyl enehexamethylene diamine, p- or m-xylylene diamine, bis-(4-amino cyclohexyl)methane, 3-amino methyl-3,5,5-trimethyl cyclohexyl amine or 1,4-diaminomethyl cyclohexane.

A particularly preferred diamine for use in the present invention is hexamethylenediamine of the formula:

$$H_2N - (CH_2)_6 - NH_2.$$

Suitable dicarboxylic acids for use in the present invention are of the general formula:

$$\underset{\text{HO}-\overset{\overset{\displaystyle O}{\|}}{C}-R_2-\overset{\overset{\displaystyle O}{\|}}{C}-\text{OH}}{} \qquad (III)$$

wherein $R_2$ is an aliphatic, aromatic, unsaturated, or mixtures of hydrocarbons having from 1 to 20 carbon atoms. Examples of suitable dicarboxylic acids include sebacic acid, heptadecaniodicarboxylic acid, adipic acid, 2,2,4-or 2,4,4-trimethyl adipic acid, and terephthalic acid. Blends of dicarboxylic acids may also be employed.

A particularly preferred dicarboxylic acid for use in the present invention is isophthalic acid which has the formula:

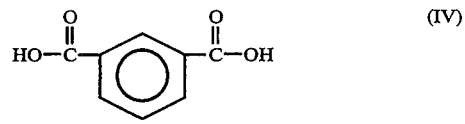

(IV)

Also preferred are blends of isophthalic acid and terephthalic acid, for example, 65 mole % isophthalic acid and 35% terephthalic acid.

The term dicarboxylic acid is meant to include reactive diesters of a dicarboxylic acid such as those represented by the formula:

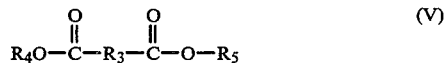

$$R_4O-\overset{\overset{\displaystyle O}{\|}}{C}-R_3-\overset{\overset{\displaystyle O}{\|}}{C}-O-R_5 \qquad (V)$$

wherein $R_3$, $R_4$ and $R_5$ are the same or different aliphatic, aromatic or unsaturated hydrocarbons having from 1 to 20 hydrocarbons.

A particularly suitable diester of a dicarboxylic acid is diphenylisophthalate of the formula:

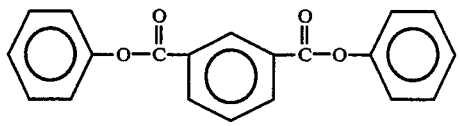  (VI)

Also preferred are blends of diesters of dicarboxylic acids such as blends of isophthalic acid and terephthalic acid.

If a diaryl ester of a dicarboxylic acid is employed, then phenol may be produced as a byproduct in the production of the polyamide. Excess phenol should be removed from the polyamide because the presence of phenol will inhibit adhesion between the polyamide and polycarbonate layers.

Suitable multifunctional monomers for use in the present invention are polyamines of the general formula:

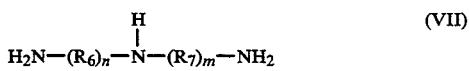  (VII)

wherein $R_6$ and $R_7$ are the same or different aliphatic, aromatic, or unsaturated hydrocarbons, n is an integer from 1 to 6, and m is an integer from 1 to 6.

It is important that the internal amine is less reactive than the amine end groups to prevent unduly large viscosity increases that can result from undesired cross-linking during formation of the functionalized polyamide. It is also important that at least a slight excess of amine (for example 1% based on total moles of acid) be employed in the reaction so that the internal amine does not become capped by reacting with excess dicarboxylic acid.

Particularly suitable multifunctional monomers for use in the present invention include diethylenetriamine of the formula:

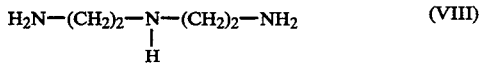  (VIII)

3,3'-iminobispropyl amine of the formula:

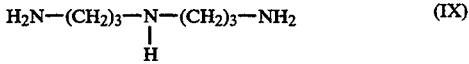  (IX)

and bishexamethylene triamine of the formula:

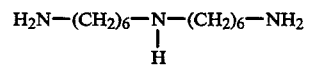  (X)

The multifunctional monomer is preferably present at a level of from about 3 percent to about 99 percent by mole based on the combined total moles of multifunctional monomer and moles of diamine and more preferably from about 5 percent to about 20 mole percent thereof, and most preferably about 10 percent thereof. It was found that adhesion of the polyamide to the polycarbonate was only successful when excess amine groups were present i n the reaction mixture so that the internal functional amine groups are not capped by excess acid groups. High ratio amine can be achieved by either the addition of an amine chain stopper or by employing the multifunctional monomer in excess of the dicarboxylic acid or the diester of the dicarboxylic acid. An example of a suitable chain stopper is docadecylamine.

The preferred embodiment of the present invention comprises reacting diphenyl isophthalate, hexamethylenediamine and diethylenetriamine according to the generalized reaction scheme:

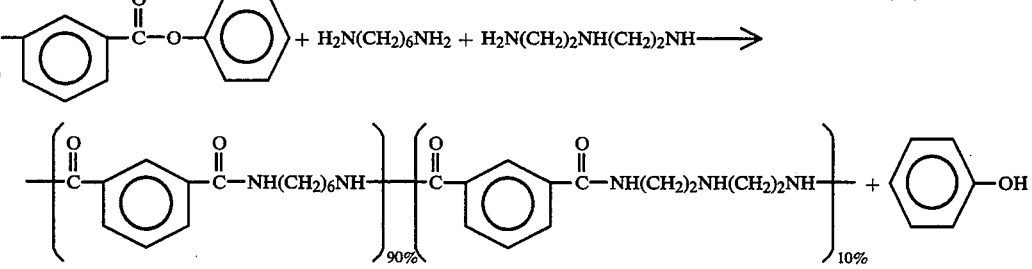  (XI)

Preferably the diethylenetriamine is present at about 10% mole based on the total moles of hexamethylenediamine and diethylenetriamine. It has been found that when the dicarboxylic acid is a diester derivative, the phenol should be removed from the polyamide before the polyamide and the polycarbonate are adhered to each other. Suitable polyamides may be obtained from reaction mixtures of hexamethylenediamine, a polyamine, isophthalic acid and terephthalic acid.

The polyamides and polycarbonates can be adhered to each other by suitable methods, such as coextrusion or by pressing the films or sheets together under high pressure and heat. The polyamide and polycarbonate layers should each be at least a half mil thick. The resulting multilayered structures can be used to form laminates and shaped articles, such as bottles.

Although the desired thickness of each layer will depend on the desired properties of the particular structure, a suitable bottle structure could have the polyamide layer preferably being a thickness of from 1 mil to 60 mils, more preferably from 2 mils to 30 mils and most preferably about 10 mils, and the polycarbonate layer preferably being a thickness of from 1 mil to 60 mils, more preferably from 2 mils to 30 mils and most preferably about 10 mils.

The term multilayered is meant to include structures having two or more layers.

The following examples are set forth to illustrate the present invention and are not to be construed as limiting the scope of the invention thereto.

EXAMPLES

The following examples illustrate the present invention but are not meant to limit the scope thereof.

TABLE 1

| | | Adhesion to Thermoplastics | | |
|---|---|---|---|---|
| Examples | % DETA[a] | iv (dl/g)[b] | Tg (°C.)[c] | Laminated Adhesion[d] |
| 1 | 0 | 0.967 | 123 | No |
| 2 | 1 | 1.052 | 128 | No |
| 3 | 3 | 1.182 | 128 | Some |
| 4 | 5 | 1.182 | 123 | Yes |
|   | 5 | 1.264 | 128 | Yes |
| 5 | 10 | 1.087 | 131 | Yes |
|   | 10 | 0.971 | 130 | Yes |

[a] % DETA is mole percent of diethylene triamine based on total moles of diethylenetriamine and hexamethylenediamine (HMDA). Example 1 was nylon 6,I. Examples 2 to 5 were DETA modified nylon 6,I obtained by reacting DETA and HMDA with diphenyl isophthalate (DPI).
[b] iv (dl/g) were determined for the polyamide in 60/40 phenol/tetrachloroethane at 25° C.
[c] Tg is the glass transition temperature in °C. for the polyamide.
[d] The laminate was obtained by pressing together a film of polycarbonate made from the reaction products of bisphenol A and phosgene and a film of the polyamide at a temperature of 550° F.

TABLE 2

Summary of Film Adhesion Study

| No. | Polyamide | Polyamide Film Quality | Adhesion to Polycarbonate |
|---|---|---|---|
| 6 | 50% DETA/50% HMDA 100% DPI[e] | Brittle | Yes, But Very Brittle |
| 7 | 100% DETA/100% DPI Excess Amine | Very brittle | Yes, But Very Brittle |
| 8 | 10% DETA/90% HMDA/100% DPI Excess Amine | Flexible | Yes, Flexible |
| 9 | 1% DETA/99% HMDA/100% DPI Excess Amine | Flexible | No |
| 10 | 5% DETA/95% HMDA/100% DPI Excess Amine | Flexible | Yes, Flexible |
| 11 | 1% DETA/99% HMDA/100% DPI Excess DPI | Flexible | No |
| 12 | 5% DETA/95% HMDA/100% DPI No Excess | Flexible | No |
| 13 | 10% DETA/90% HMDA/100% DPI No Excess | Flexible | No |
| 14 | 10% DETA/90% HMDA/100% DPI Excess DPI | Flexible | No |
| 15 | 1% DETA/99% HMDA/100% DPI No Excess | Flexible | No |
| 16 | 1% DETA/99% HMDA/100% DPI Excess DPI | Flexible | No |
| 17 | 5% DETA/95% HMDA/100% DPI Excess Amine | Flexible | Yes |
| 18 | 3% DETA/97% HMDA/100% DPI Excess Amine | Flexible | Some |
| 19 | 5% DETA/95% HMDA/100% DPI | Flexible | Some |
| 20 | 5% DETA/95% HMDA/100% DPI Excess Amine | Very Brittle | Yes, Brittle |
| 21 | 10% DETA/10% MXDA/80% HMDA/100% DPI | Very Brittle | Yes, Very Brittle |
| 22 | 5% BHMTA/95% HMDA/100% DPI | Brittle | Yes, Flexible |
| 23 | 25% DETA/75% HMDA/100% DPI | Brittle | Yes, Some Brittleness |
| 24 | 10% BHMTA/90% HMDA/100% DPI | Flexible | Yes, Flexible |
| 25 | 5% DETA/95% HMDA/100% DPI | Flexible | Yes, Borderline |
| 26 | 5% DETA/95% HMDA/100% DPI | Flexible | Yes, Flexible |
| 27 | 75/25 MXDA/DETA 100% DPI | Brittle | Yes, Very Brittle |
| 28 | 50/50 MXDA/DETA 100% DPI | Very Brittle | Yes, Very Brittle |
| 29 | 25/75 MXDA/DETA 100% DPI | Very Brittle | Yes, Very Brittle |

[e] % DPI is mole percent of diphenyl isophthalate based on total moles of diaryl ester of dicarboxylic acid reacted.
BHMTA is bis(hexamethylene)triamine.

What is claimed is:

1. A multilayered bonded laminated structure comprising:
   (a) an aromatic polycarbonate resin layer; and
   (b) a polyamide resin layer exhibiting gas barrier properties, said polyamide resin comprising the reaction product of:
      (i) a dicarboxylic acid,
      (ii) a diamine, and
      (iii) an effective amount comprising at least about 3 mole percent of (iii) based on total moles of (ii) and (iii) of a polyamine of the general formula:

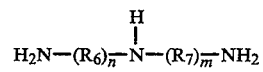

wherein $R_6$ and $R_7$ are independently selected from aliphatic, aromatic, and unsaturated hydrocarbons and n is an integer of from 1 to 6, and m is an integer from 1 to 6 said polyamine containing an internal amine group which is less reactive than the terminal amine groups and said polyamine having a concentration greater than approximately 1% of the dicarboxylic acid concentration, based on total moles of dicarboxylic acid, said layers (a) and (b) being in direct adhesive contact with each other without the use of a tie layer therebetween.

2. The multilayered structures of claim 1 wherein said polyamide layer is at least 1 mil thick.

3. The multilayered structure of claim 1 wherein said acid is diphenylisophthalate of the formula:

4. The multilayered structure of claim 1 wherein said diamine is hexamethylenediamine.

5. The multilayered structure of claim 1 wherein said polyamines are from the group consisting of:
(a) diethylene triamine
(b) 3,3'-iminobispropylamine, and
(c) bis(hexamethylene)triamine.

6. The multilayered structure of claim 1 wherein said structure is a hollow container.

7. The multilayered structure of claim 1 wherein said dicarboxylic acid is a mixture of isophthalic and terephthalic acid.

* * * * *